Patented Oct. 16, 1923.

1,470,637

UNITED STATES PATENT OFFICE.

EMIL E. NOVOTNY, OF LOGAN, PENNSYLVANIA, AND DONALD S. KENDALL, OF GLEN RIDGE, NEW JERSEY, ASSIGNORS TO JOHN STOGDELL STOKES, OF HUNTINGDON VALLEY POST OFFICE, PENNSYLVANIA.

ACETYLENE-ALDEHYDE FUSIBLE RESIN.

No Drawing. Application filed January 17, 1922. Serial No. 529,945.

*To all whom it may concern:*

Be it known that we, EMIL E. NOVOTNY and DONALD S. KENDALL, citizens of the United States, and residents, respectively, of Logan and Glen Ridge, in the counties of Philadelphia and Essex, respectively, and States of Pennsylvania and New Jersey, respectively, have invented certain new and useful Improvements in Acetylene-Aldehyde Fusible Resin, of which the following is a specification.

This invention relates to plastics or compositions and to the process of making the same, and has for its particular object the production of a synthetic resin formed of acetylene resin and an aldehyde of such qualities as will adapt it for ready use in the arts, and which will have indefinite keeping qualities, but when properly subjected to the action of heat or heat and pressure, will undergo chemical reaction and assume a hard, set, infusible, strong, tenacious form. Furthermore the production of a permanently fusible soluble resin which will harden rapidly with a suitable hardening agent, such as hexa-methylene-tetramin, to produce a hard, infusible product upon the application of heat at molding temperatures.

We are aware that some work has been done in the matter of producing a condensation product of phenol and acetylene in the presence of mercuric sulphate as a contact agent and sulphuric acid as a catalyst. Furthermore, we are aware that it has been attempted to harden this acetylene resin with paraldehyde, sufficient paraldehyde being added thereto to harden such material upon subsequent heating to a final hard and infusible form. This material, however, has limited keeping qualities and the reaction must take place in the presence of an acid catalyst. The presence of this acid catalyst is objectionable, as it has a corrosive and destructive action on the metallic surfaces of a mold or on the cellulose of a fibrous body which it is desirable to incorporate therewith.

In our endeavor to utilize these acetylene condensation products, we use a phenol-freed acetylene resin in combination with hexa-methylene-tetramin, and have found that the product is not satisfactory because of the slow rate of hardening and its weak and brittle characteristics.

On the other hand, we have found that if the viscous, semi-liquid, preferably phenol-freed acetylene resin is first combined with a small quantity of paraldehyde, a hard, soluble, premanently fusible resin is produced in which the paraldehyde is totally combined, and which, if mixed with hexa-methylene-tetramin and subjected to heat or heat and pressure, will produce a hard, infusible, insoluble, tough strong condensation product in a few minutes and without acting through the agency of an acid catalyst. Our acetylene resin aldehyde condensation product reacts with great speed, is free from all acid catalysts and can be kept on hand indefinitely in ready-for-use condition or shipped broadcast as desired. The material is considerably cheaper than synthetic resins produced of phenol and formaldehyde, and has all of their desirable attributes.

In order to enable those skilled in the art to practice our invention, we give below the following specific details of the process:—

The following mixture and proportion by weight of materials is used:—

100 parts of phenol-freed phenol acetylene resin, containing one-half of one part of a mineral acid such as sulphuric acid and 8 parts of paraldehyde. The acetylene resin is first placed in a suitable acid and pressure resisting container such as an autoclave, said container being provided with a suitable agitator and a jacket for the purpose of heating the container with steam or cooling it with water. The mixture is heated through the admission of steam into the jacket until a temperature of about 260° F. has been reached. The agitator is started and the paraldehyde is slowly added into the enclosed vessel through a suitable pressure resisting and balancing tank above the digester. Considerable heat is generated by this reaction and it is, therefore, necessary to close off the steam and turn on the water. By this method of adding the paraldehyde slowly and cooling the mass by introducing water into the jacket and the use of the agitator, the reaction may readily be controlled to maintain the pressure within the autoclave below the maximum pressure limit of this container or say 100 lbs. per square inch. The mixture is kept in the container under agitation for a period of about one hour or for a sufficient length of time until every trace of the paraldehyde has been combined therewith. It will be found that the bulk of the material will combine rapidly, but on the other hand, considerable gaseous acetaldehyde to which this paraldehyde is converted by the acid medium, will be present in the upper portion of the autoclave, and this will, of course, combine more slowly, being in surface contact only. At this point we introduce a sufficient quantity of ammonia or any suitable alkali or alkali carbonate to more than neutralize the acid catalyst present. At this stage the resin is ready for use, and may be drawn off from the autoclave by means of a suitable valve or opening at the bottom or in any well-known manner. We find, however, that this condensation product has impurities present possibly due to side reactions, and these impurities have the effect of causing sticking to the mold and otherwise giving ununiform results, and it is, therefore, better to introduce steam into the mass to purify this resin by the well-known process of steam distillation. Of course where the material is not to be used for such high grade molding as printing plates and sound records, this operation may be dispensed with, but it is preferable from the standpoint of producing a uniformly standardized product.

The resultant fusible gum now has the characteristics of a dry, friable, grindable shellac-like material which may be heated for any length of time without undergoing a further reaction, or in other words, is permanently fusible and is soluble in the well-known resin solvents such as alcohol or acetone. At this stage it may be used for various molding purposes where such materials as shellac are now used, as, for instance, in the manufacture of buttons or of the ordinary well-known type of fusible sound records, and is, therefore, useful because of its cheapness and because it may be remolded or recast any number of times in the same manner as shellac is now handled.

By grinding this fusible material in a burr grinder or ball-mill to a finely comminuted powder, it may be mixed with various fillers such as rotten-stone, cotton-flock, wood-flour, cellulose, lamp-black, etc., to be formed into powder or rolled into plastic sheets for use in the manufacture of such materials as sound records, buttons, etc., and being permanently fusible, is inexpensive from the standpoint of re-use of previously cast articles.

By utilizing this powdered comminuted material and mixing therewith from 5 to 10 parts of a hardening agent such as hexa-methylene-tetramin as in a suitable ball-mill and introducing therewith any desired fillers and lubricants, we produce therefrom a potentially reactive material of long keeping qualities which may be molded under heat and pressure to form finely polished, accurately dimensioned, final infusible reaction products at temperatures of from 200 to 400° F. for a period of from one to ten minutes.

It may be found desirable, however, to partially combine the hardening agent, hexa-methylene-tetramin, with this resin, and, therefore, we prefer to subject the mass described in the preceding paragraph to a low temperature of say 120° to 130° F. for a period of from one to four hours. This mixture may again be ground in a burr grinder or ball-mill and it may be used for incorporation at the beaters of a paper forming machine to thoroughly incorporate this resin with the paper pulp in any desired quantity without dissolving out the hexa-methylene-tetramin, which is normally soluble in water in large quantities.

The fusible resin may be placed into solution in a suitable solvent such as alcohol, in the usual quantities of say equal parts by weight of the fusible resin and solvent to be used as a shellac-like varnish. To this may be added the proportion of say 5 to 10 parts of the hardening agent, hexa-methylene-tetramin, when it immediately becomes a potentially reactive resin capable of reacting to a hard, tough, set and infusible form. It may be shipped in such solution to the ultimate user either in its permanently fusible or potentially reactive forms.

This potentially reactive form of varnish is suitable for use in mixing with various fillers, such as corncob cellulose, wood-flour, asbestos, lamp-black, etc., to form various molding mixtures in the well-known manner, or it may be impregnated into various fibrous materials such as paper, cloth, felt, etc. to produce the well-known hard, fibre products for electrical insulation and various mechanical uses in the arts. In the production of these varnishes, suitable colors or pigments may be added for the purpose of coloring the mass should other than the natural dark brown color of the material be desired.

It is also advantageous to add a suitable lubricant such as say 1% stearic acid to the weight of the gum being used to prevent adhesion and give better flowing qualities. This may be added either to the dry mixtures during the grinding operation or to the solvents when the resin is put in solution.

In connection with our invention and the various examples given, we wish it to be understood that we do not confine ourselves to all the precise proportions or to the details herein set forth by way of illustration, as modification and variation may be made as conditions may require, or it may be deemed desirable; for example—

Wherein we have described specifically the use of paraldehyde for the condensing agent, we wish it to be understood that we may substitute acetaldehyde or any of its polymers. We may also use for this purpose other aldehydes such as formaldehyde and furfural in suitable proportions or their polymers.

What we claim is—

1. A new composition of matter comprising a permanently fusible, soluble condensation product of an acetylene resin and an aldehyde.

2. A new composition of matter comprising a permanently fusible, solube condensation product of an acetylene resin and an aldehyde and a hardening agent therefor, said composition being convertible by heat into a hard, insoluble, infusible body.

3. A new composition of matter comprising a permanently fusible, soluble condensation product of an acetylene resin and an aldehyde and a hardening agent therefor, comprising a methylene-containing body, said composition being convertible by heat into a hard, insoluble, infusible body.

4. A new composition of matter comprising a permanently fusible, soluble condensation product of an acetylene resin and an aldehyde and a hardening agent comprising a hexa-methylene-tetramin, said composition being convertible by heat into a hard, insoluble, infusible body.

5. The herein described method which consists in combining with an acetylene resin incapable of itself of reacting with the hexa-methylene-tetramin to produce a hard, strong, infusible product, an aldehyde of sufficient quantity to produce a hard, dry, permanently fusible resin wherein the aldehyde is combined and the resulting resin is soluble in alcohol or acetone and capable of reacting with hexa-methylene-tetramin to form a hard infusible, insoluble body by the action of heat or heat and pressure.

6. The herein described method which consists in combining with an acetylene resin incapable of itself of reacting with the hexa-methylene-tetramin to produce a hard, strong, infusible product, an aldehyde of sufficient quantity to produce a hard, dry, permanently fusible resin wherein the aldehyde is combined and adding a hardening agent thereto and being convertible to a hard, infusible, insoluble body by the action of heat or heat and pressure.

7. The herein described method which consists in combining with an acetylene resin incapable of itself of reacting with hexa-methylene-tetramin to produce a hard, strong, infusible product, an aldehyde of sufficient quantity to produce a hard, dry, permanently fusible resin wherein the aldehyde is combined and adding hexa-methylene-tetramin thereto and being convertible to a hard, infusible, insoluble body by the action of heat or heat and pressure.

8. The herein described method which consists in combining with an acetylene resin incapable of itself of reacting with the hexa-methylene-tetramin to produce a hard, strong, infusible product, an acetic aldehyde of sufficient quantity to produce a hard, dry, permanently fusible resin wherein the acetic aldehyde is combined and the resulting resin soluble in alcohol or acetone and capable of reacting with hexa-methylene-tetramin to form a hard, infusble, insoluble body by the action of heat or heat and pressure.

9. The herein described method which consists in combining with an acetylene resin incapable of itself of reacting with the hexa-methylene-tetramin to produce a hard, strong, infusible product, paraldehyde of sufficient quantity to produce a hard, dry, permanently fusible resin wherein the paraldehyde is combined and the resulting resin soluble in alcohol or acetone and capable of reacting with hexa-methylene-tetramin to form a hard, infusible, insoluble body by the action of heat or heat and pressure.

10. The herein described method which consists in combining with an acetylene resin incapable of itself of reacting with hexa-methylene-tetramin to produce a hard, strong, infusible product, an acetic aldehyde of sufficient quantity to produce a hard, dry, permanently fusible resin wherein the acetic aldehyde is combined and the resulting resin soluble in alcohol or acetone, and adding a hardening agent thereto.

11. The herein described method which consists in combining with an acetylene resin incapable of itself of reacting with hexa-methylene-tetramin to produce a hard, strong, infusible product, an acetic aldehyde of sufficient quantity to produce a hard, dry, permanently fusible resin wherein the acetic aldehyde is combined and the resulting resin soluble in alcohol or acetone, and adding a methylene-containing body thereto.

12. The herein described method which consists in combining with an acetylene resin incapable of itself of reacting with hexa-methylene-tetramin to produce a hard, strong, infusible product, an acetic aldehyde of sufficient quantity to produce a hard, dry, permanently fusible resin wherein the acetic aldehyde is combined and the resulting resin soluble in alcohol or acetone, and adding hexa-methylene-tetramin thereto.

Signed at Philadelphia, in the county of Philadelphia, and State of Pennsylvania, this 14th day of January, A. D. 1922.

EMIL E. NOVOTNY.
DONALD S. KENDALL.